(12) United States Patent
Theuerkauf

(10) Patent No.: US 9,882,205 B2
(45) Date of Patent: Jan. 30, 2018

(54) METHOD FOR PRODUCING A COATING MATERIAL FOR COATING ELECTRODE CARRIERS AND COATING MATERIAL IN GRANULE FORM

(71) Applicant: TARANIS GmbH, Nordhausen (DE)

(72) Inventor: Stefan Matthias Winfried Theuerkauf, Nordhausen (DE)

(73) Assignee: TARANIS GmbH, Nordhausen (DE)

( * ) Notice: Subject to any disclaimer, the term of this patent is extended or adjusted under 35 U.S.C. 154(b) by 0 days.

(21) Appl. No.: 14/652,112

(22) PCT Filed: Dec. 2, 2013

(86) PCT No.: PCT/EP2013/075239
§ 371 (c)(1),
(2) Date: Jun. 13, 2015

(87) PCT Pub. No.: WO2014/090618
PCT Pub. Date: Jun. 19, 2014

(65) Prior Publication Data
US 2015/0340685 A1 Nov. 26, 2015
US 2017/0250398 A2 Aug. 31, 2017

(30) Foreign Application Priority Data

Dec. 14, 2012 (EP) .................................... 12197335

(51) Int. Cl.
| H01B 1/20 | (2006.01) |
| H01M 4/04 | (2006.01) |
| H01M 4/139 | (2010.01) |
| H01M 4/36 | (2006.01) |
| H01M 4/485 | (2010.01) |
| H01M 4/505 | (2010.01) |
| H01M 4/525 | (2010.01) |
| H01M 4/587 | (2010.01) |
| H01M 4/62 | (2006.01) |

(52) U.S. Cl.
CPC .............. *H01M 4/364* (2013.01); *H01B 1/20* (2013.01); *H01M 4/0402* (2013.01); *H01M 4/485* (2013.01); *H01M 4/505* (2013.01); *H01M 4/525* (2013.01); *H01M 4/587* (2013.01); *H01M 4/623* (2013.01)

(58) Field of Classification Search
CPC .... H01B 1/20; H01B 1/22; H01B 1/24; B01F 1/0005; B01F 3/08; B01F 3/1207; B01F 3/1214; B01F 3/2078; B01F 3/2115; B01F 3/2284; B01F 2001/0044; B01F 2001/005; B01F 2003/005; B01F 2003/0982; B01F 2003/125; B01F 2003/1257; H01M 4/0402; H01M 4/0409; H01M 4/0411; H01M 4/0414; H01M 4/0416; H01M 4/139; H01M 4/1391; H01M 4/13915; H01M 4/1393; H01M 4/1395; H01M 4/1397; H01M 4/364; H01M 4/62; H01M 4/621; H01M 4/622; H01M 4/623; H01M 4/624; H01M 4/625; H01M 5/626; B01D 71/34

See application file for complete search history.

(56) References Cited

U.S. PATENT DOCUMENTS

| 4,384,047 | A | * | 5/1983 | Benzinger | .............. | B01D 71/34 210/500.36 |
| 5,922,493 | A | * | 7/1999 | Humphrey, Jr. | ..... | H01M 2/0275 429/175 |
| 6,143,216 | A | | 11/2000 | Loch et al. | | |
| 2002/0168569 | A1 | * | 11/2002 | Barriere | ................ | H01M 2/164 429/217 |
| 2005/0037262 | A1 | * | 2/2005 | Vallee | ................. | H01M 4/0404 429/217 |
| 2006/0032045 | A1 | * | 2/2006 | Naarmann | .......... | H01M 4/0404 429/217 |
| 2009/0214949 | A1 | | 8/2009 | Ugawa | | |
| 2012/0015246 | A1 | * | 1/2012 | Amin-Sanayei | ....... | H01G 11/30 429/217 |

FOREIGN PATENT DOCUMENTS

EP        0730316        9/1996

OTHER PUBLICATIONS

International Search Report and Written Opinion of PCT/EP2013/075239 dated Jan. 29, 2014.

* cited by examiner

*Primary Examiner* — Harold Pyon
*Assistant Examiner* — Matthew R Diaz
(74) *Attorney, Agent, or Firm* — Rankin, Hill & Clark LLP

(57) ABSTRACT

The invention relates to a method for preparing a coating material for coating an electrode carrier. For known coating materials, the problem exists that these either cannot be stored without the input of energy or cannot be produced without quality fluctuations. To solve these problems, the method according to the invention comprises the steps of a) providing a dry mixture containing at least i) an active material, ii) a conductivity additive, as well as iii) a fluorine-containing polymer binder, b) bringing the dry mixture into contact with a solvent mixture containing ethylene carbonate and/or propylene carbonate, c) thoroughly mixing the solvent mixture and the dry mixture at a temperature of more than 80° C. until the fluorine-containing polymer binder has dissolved completely in the solvent mixture, wherein d), after the fluorine-containing polymer binder has dissolved completely, the mixture obtained is cooled to a temperature of less than 40° C. and the mixture obtained cures during the cooling process and e), the mixture obtained is granulated during or after the curing process. The granules obtained with the method can be stored without problems and can be used without quality fluctuations to coat an electrode carrier.

10 Claims, No Drawings

METHOD FOR PRODUCING A COATING MATERIAL FOR COATING ELECTRODE CARRIERS AND COATING MATERIAL IN GRANULE FORM

The present invention relates to a method for producing a coating material for coating an electrode carrier of an electrical energy storage system, a thermoplastic granular material for coating a corresponding electrode carrier and a method for coating an electrode carrier.

The effective storage of electrical energy is an essential item of future energy policies and an important component of concepts for protecting the environment and resources. Lithium ion batteries, rechargeable batteries and capacitors occupy an important place in this connection. They are of central importance especially from the point of view of electromobility and for the temporary storage of, for example, energy obtained from wind power.

For producing lithium ion batteries, rechargeable batteries or capacitors, an active layer is applied on an electrode carrier. This active layer comprises active material, conductivity additives and a binder, the aforementioned materials being dissolved or dispersed in a solvent.

If an organic solvent is used, for example, in the production of the active layer, it usually behaves so that the binder dissolves completely in the solvent. N-Methyl-pyrrolidone (NMP) and N-ethyl-pyrrolidone (NEP) have proven their value as organic solvents for coating an electrode carrier for producing the electrodes of an electrical energy storage system. The binders usually used dissolve in these solvents at room temperature if mechanical energy is introduced, the dissolution process taking several hours. As binders, fluorine-containing polymers, such as polyvinylidene fluoride homopolymer (PVDF) and polyvinylidene fluoride copolymer (PVDF copolymer), for example, as well as any mixtures thereof, are usually used.

A problem with the use of the aforementioned solvents for the preparation of the active material or the coating material is that the viscosity changes with time and, if mechanical energy is not introduced constantly, the danger exists that the heavier particles will settle. Especially when NMP is used, there is the further problem that this material is classified as poisonous. The use of NEP is also critical, since this material is harmful to health, especially when taken by mouth. For work, safety and environmental reasons, it is therefore desirable to replace the aforementioned solvents with ones that are better tolerated.

It is a further disadvantage of the aforementioned solvents that, in relation to the active material, the conductivity additives and the binder, relatively large amounts of solvents must be used for the preparation of the coating material. Since these solvents have a negative effect on the cell chemistry of the later energy storage system, they must be removed once again after the coating material is applied onto the electrode carrier. This is time-consuming and energy- and cost-intensive because of the high boiling temperatures of the aforementioned solvents.

It is also known from the prior art that the active material, the conductivity additives and the binder are first mixed with a solvent in an extruder. Admittedly, such a procedure avoids the problem of heavier particles settling; however, in such a case, two mass flows must be controlled, namely those of the solvent and the powdery solids. Conveying and controlling a powdery mass flow is always costly. A flowing, powdery material tends to develop pressure surges, which spread through the solid and are responsible for a temporary shift in the solids/solvent composition. The pressure surges result from refilling the powdery solids materials, since the metering device is switched over from gravimetric metering to volumetric metering during the refilling process.

It is therefore an object of the present invention to make available a coating material as well as a method for producing the coating material, by means of which an electrode carrier can be coated procedurally simply and be of consistent quality.

This objective is achieved according to the invention by a method according to claim 1. For the method according to the invention of preparing a coating material for coating an electrode carrier of an electrical energy storage system, a dry mixture, containing at least active material, a conductivity additive as well as a fluorine-containing polymer binder, is first provided. The active material may only be one material; as such, however, it may also be a mixture of materials. The same applies for the conductivity additive as well as for the fluorine-containing polymer binder. The polymer binder itself is selected from a group comprising polyvinylidene fluoride (PVDF), a polyvinylidene fluoride copolymer (PVDF copolymer) or any mixture of PVDF and/or at least one PVDF copolymer.

The dry mixture is brought into contact with a solvent mixture, which comprises at least 60% by weight ethylene carbonate (EC) and/or propylene carbonate (PC), that is, the solvent mixture contains at least 60% by weight ethylene carbonate or 60% by weight propylene carbonate or 60% by weight of any mixture of ethylene carbonate and propylene carbonate. The fluorine-containing polymer binder, and the mixture of solvents are present in a ratio of 1:(5-30).

Preferably, the solvent mixture comprises 80% by weight ethylene carbonate or 80% by weight propylene carbonate or 80% by weight of any mixture of ethylene carbonate and propylene carbonate. In particular, a solvent mixture with 100% ethylene carbonate and/or propylene carbonate or any mixture is preferred, since the dissolution of the polymer binder in the solvent mixture is accelerated by a high content of ethylene carbonate and/or propylene carbonate.

For example, the solvent mixture can be metered into the dry mixture after the latter has been prepared; however, it is also conceivable that the solvent mixture is injected into the prepared dry mixture.

The dry mixture and the solvent mixture are thoroughly mixed at a temperature of 80° C. or higher until the fluorine-containing polymer binder has dissolved completely in the solvent mixture. In this connection, it is immaterial whether the temperature of 80° C. or higher is reached only after the dry mixture and the solvent mixture are brought together or if the two materials are already added together at temperatures of 80° C. or higher. In this connection, it should be noted that the 80° C. relates to a method which is carried out at atmospheric pressure.

The fluorine-containing polymer binder dissolves completely in a solvent mixture, which contains at least 60% by weight ethylene carbonate and/or propylene carbonate, at temperatures of 80° C. or higher (under atmospheric pressure) and does so significantly more rapidly than is the case with known methods with NEP or NMP. Such a dissolving process does not take place at room temperature, or at temperatures below 80° C., even after prolonged mixing.

The fluorine-containing polymer binder and the solvent mixture are present in a ratio of 1:(5 to 30) and, as the fluorine-containing polymer binder, polyvinylidene fluoride (PVDF), a polyvinylidene fluoride copolymer (PVDF copolymer) or a mixture of PVDF and a PVDF copolymer is used, the ratio of polymer binder to the solvent mixture depending on the chain length and the molecular weight the polymer binder used.

The mixture, obtained after the mixing and after the complete dissolution of the fluorine-containing polymer binder, is cooled to a temperature below 40° C., the mixture obtained, because of the composition according to the invention, curing and the mixture obtained being granulated during or after the curing process.

In accordance with the invention, a coating agent is therefore obtained in the form of a granular material. This may now be processed further in an extruder. On the one hand, the coating material, present in the form of a granular material, prevents that heavier particles settle over time, and a continuous supply of energy, such as that necessary for coating materials based on NEP/NMP, is no longer required. When the coating material is applied on an electrode carrier, only one mass flow, namely that of the granular material, has to be controlled and conveyed and not two mass flows. Because of the granule form, pressure surges, which are typical for powdery solids, need no longer be feared and the granular material can be applied without fluctuations in composition.

If it is not processed further immediately, the granular material according to the invention can be packaged and transported without great effort. The thermoplastic material can then be melted once again on site and be used to coat electrode carriers (for producing electrodes) for electrical storage systems. Previously, any combination with centralized processing was not possible, since the transport of known coating materials could not be realized because of the need for permanently introducing energy.

The method according to the invention combines a plurality of further advantages in itself Because of the use of a solvent mixture with ethylene carbonate and/or propylene carbonate, the method is safer for work, safety and environmental protection reasons. Furthermore, it is cheaper since, in comparison to NMP or NEP as the solvent, a lesser amount of solvent is required for the same amount of dry mixture. In turn, during the further processing, this requires a shorter drying furnace because of the lesser amount of solvent. It is a further advantage of the method according to the invention that the solvents EC/PC do not affect the cell chemistry of the later energy storage system—for example, EC is frequently used as a component of the electrolyte.

It is a further advantage of the method according to the invention that the fluorine-containing polymer binder dissolves more rapidly in the solvent mixture than is the case for a method based on NMP or NEP; in accordance with the invention, the coating material can thus be produced more rapidly (and therefore also more inexpensively). Because of the safety of the solvents used, the cost of cleaning up the equipment used for producing the coating materials is also less.

When a solvent mixture with a high propylene carbonate content is used, the granular material obtained may, under some circumstances, "sweat out" a little solvent. In order to prevent the granular material from sticking together, provisions are made for one embodiment of the method that up to 1% by weight MgO or Al2O3 or a mixture thereof is added to the granular material obtained after the granulation.

The fluorine-containing polymer binder ensures good adhesion of the coating material to the electrode carrier and within the coating itself Especially preferred are PVDF-hexafluoropropylene (PVDF-HFP), PVDF-tetrafluoroethylene (PVDF-TFE) or PVDF-chlorotetrafluorethylene (PVDF-CTFE) or mixtures thereof.

A person skilled in the art understands "active material" to be a material or a mixture of materials, which enables the reversible storage and retrieval of electrically charged particles. Then, during the storage or retrieval process of the electrically charged particle in the finished, ready to use electrical energy storage system, a charging or discharging current may flow, depending on the construction of the storage system. In the case of a lithium ion battery, the electrically charged particles are lithium ions. The storage and retrieval processes take place at the cathode and at the anode during the charging or discharging. Different active materials are used to produce the anode and the cathode. For the method according to the invention, the active material is preferably selected from a group comprising graphite, amorphous carbons, lithium storage metals and/or alloys (such as nanocrystalline and/or amorphous silicon, silicon-carbon composites (SiC composites), silicon-tin-carbon composites, tin-carbon composites, tin (SnC composites, SiSnC composites), aluminum, antimony, Li4Ti5O12 (LTO), lithium metal oxides of the LiMxMyMzOa type (M being selected from Co, Ni, Mn, Al, V; $0 \leq x \leq 0.85$, $0 \leq y \leq 0.5$, $0 \leq z \leq 0.1$; $1 \leq a \leq 4$) or lithium metal phosphates LiMPO4 (such as LiFePO4, LiMnFePO4, LiCoPO4, LiVPO4) and doping of the aforementioned lithium metal oxides and lithium metal phosphates with magnesium and niobium, silicon carbides, magnesium oxides, titanium oxides, aluminum oxides, zirconium oxides, calcium carbides, as well as fillers selected from the group comprising NaCl, KCl, LiBF4, LiClO4, LiBOB, LiPF6) with a particle spectrum ranging between $0.01 \leq x \leq 35$ µm or mixtures thereof.

The conductivity additive is preferably selected from a group comprising graphite with d50 between 1 µm and 8 µm, carbon blacks with primary particles between 10 and 80 nm and carbon fibers, such as carbon nano tubes (single wall carbon nano tubes and multi wall carbon nano tubes) or any mixtures thereof. It is the task of the conductivity additives to improve the electrical conductivity of the coating and, in this way, the electrochemical reaction, that is, the storage and retrieval of the electrically charged particles.

As materials for the electrode carriers, aluminum foils are preferred for the cathode electrode and copper foils for the anode electrode. Depending on the choice of active material on the anode electrode and the voltage resulting therefrom, relative to lithium, aluminum foils or nickel foils may also be used for the anode electrodes.

The dry mixture itself preferably contains 80 to 95% by weight active material, 1.5-5% by weight conductivity additive and 2-8% by weight fluorine-containing polymer binder. A particularly preferred dry mixture for preparing a coating material for the anode comprises 94% by weight active material, 2% by weight conductivity additive and 4% by weight polymer binder. A particularly preferred dry mixture for preparing a coating material for the cathode comprises 93% by weight active material, 3% by weight conductivity additive and 4% by weight polymer binder.

The object according to the invention is furthermore achieved by a thermoplastic granular material for coating an electrode carrier of an electrical energy storage system, comprising at least i) active material, ii) a conductivity additive and iii) a fluorine-containing polymer binder, the latter being selected from a group comprising polyvinylidene fluoride (PVDF), a polyvinylidene fluoride copolymer (PVDF copolymer) or any mixture of PVDF and/or at least one PVDF copolymer and iv) a solvent mixture. In accordance with the invention, the solvent mixture comprises 60% by weight ethylene carbonate and/or propylene carbonate, that is, the solvent mixture contains at least 60% by weight ethylene carbonate or 60% by weight propylene carbonate or 60% by weight of any mixture of ethylene carbonate and propylene carbonate. Preferably, the solvent mixture comprises 80% by weight ethylene carbonate or 80% by weight propylene carbonate or 80% by weight of any mixture of ethylene carbonate and propylene carbonate. In particular, a solvent mixture with 100% ethylene carbonate and/or propylene carbonate or any mixture is preferred, since the dissolution of the polymer binder in the solvent mixture is accelerated by a high content of ethylene carbonate and/or propylene carbonate.

In accordance with the invention, the fluorine-containing polymer binder and the solvent mixture are present in a ratio by weight 1:(5-30).

Due to the use of the solvent mixture according to the invention and the adjusting of the amount of polymer binder in relation to the solvent mixture, a coating material can be achieved in the form of a granular material. This may be packaged and transported without great effort, and one is no longer dependent on preparing the coating material "on-site". Moreover, the granular material can also be stored for a longer period of time, during which its composition does not change because of its granule form. Known coating compositions based on NMP/NEP are always viscous when prepared and, in order to prevent settling of heavy particles, require a constant input of energy. The handling of the thermoplastic material according to the invention is significantly less complicated and, because the harmful solvents NMP/NEP have been replaced, the effort and costs of cleaning up after the preparation are significantly reduced. Because of the lesser amount of solvent (in relation to the polymer binder), the drying section for removing the solvent mixture after application onto an electrode carrier can be shorter, or the speed for a given drying section can be increased, which in turn reduces the costs of producing the electrodes.

The active material is preferably selected from a group comprising graphite, amorphous carbons (such as hard carbon, soft carbon, carbon nano tubes (CNT), activated charcoal, anthracite) lithium storage metals and/or alloys (such as nanocrystalline and/or amorphous silicon, silicon-carbon composites, silicon-tin-carbon composites), tin-carbon composites, tin, aluminum, antimony, $Li_4Ti_5O_{12}$ (LTO), lithium metal oxides of the $LiM_xM_yM_zO_a$ type (M being selected from Co, Ni, Mn, Al, V; $0 \leq x \leq 0.85$, $0 \leq y \leq 0.5$, $0 \leq z \leq 0.1$; $1 \leq a \leq 4$) or lithium metal phosphates $LiMPO_4$ (such as $LiFePO_4$, $LiMnFePO_4$, $LiCoPO_4$, $LiVPO_4$) and dopings of the aforementioned lithium metal oxides and lithium metal phosphates with magnesium and niobium, silicon carbides, magnesium oxides, titanium oxides, aluminum oxides, zirconium oxides, calcium carbides, as well as fillers selected from the group comprising NaCl, KCl, $LiBF_4$, $LiClO_4$, LiBOB, $LiPF_6$) with a particle size ranging from $0.01 \leq x \leq 35$ μm or mixtures of these fillers. The conductivity additive are preferably selected from a group comprising graphite with d50 between 1 μm and 8 μm, carbon blacks with primary particles between 10 and 80 nm and carbon fibers or any mixtures thereof. The dry mixture preferably contains 80 to 95% by weight active material, 1.5-5% by weight conductivity additive and 2-8% by weight fluorine-containing polymer binder.

The invention furthermore relates to a method for coating an electrode carrier of an electrical energy storage system, comprising the steps of preparing a coating material and heating the coating material to a specified coating temperature, coating the electrode carrier with the coating material and drying the coated electrode carrier, the method comprising the steps of preparing the coating material in accordance with the method according to the invention for preparing a coating material according to any of claims 1-8.

It may be inferred from the following table that the times to dissolve different polymer binders in ethylene carbonate and propylene carbonate are clearly accelerated in comparison to NEP, which is used in accordance with the prior art for the preparation of coating materials for coating electrode carriers of electrical energy storage systems.

TABLE 1

Dissolution rate of different polymer binders in EC/PC and NEP

| Polymer Nr. Binder | Solvent | Temperature (° C.) | Dissolution Time | Stirring Speed (rpm) | Viscosity (mPas) |
|---|---|---|---|---|---|
| 1  25 g Solef5031 | 475 g NEP | 25 | 24 h | 150 | 350 (25° C., 60 rpm) |
| 2  25 g Solef5031 | 475 g EC | 115 | 12 min | 150 | 220 (90° C., 60 rpm) |
| 3  25 g Solef5031 | 475 g PC | 80 | 6 min | 150 | 210 (90° C., 60 rpm) |
| 4  25 g HSV900 | 475 g NEP | 25 | 24 h | 150 | 380 (25° C., 60 rpm) |
| 5  25 g HSV900 | 475 g EC | 135 | 15 min | 200 | 250 (90° C., 60 rpm) |
| 6  25 g HSV900 | 475 g PC | 80 | 8 min | 200 | 240 (90° C., 60 rpm) |

EXAMPLES

Preparation of Thermoplastic Granular Material

Variation 1: Preparation of the thermoplastic granular material by means of a twin shaft kneader using PVDF (Kynar® HSV900) as the polymer binder and a solvent mixture with ethylene carbonate (EC) and propylene carbonate (PC) (90% by weight EC and 10% by weight PC).

a.) Mixing all of the powdery portions of the formulation (active material—NMC—93% by weight, conductivity additive—Timkal® SuperP and Timkal® KS4 2:3-2.5% by weight and polymer—Kynar® HSV900-4.5% by weight) in a vacuum mixing dryer at temperatures between 80° and 150° and at a pressure of less than 10 mbar for between 60 and 400 minutes, and preferably for 120 minutes. After that, cooling the dry mixture (dry blend) to below 40° C. and filling into a suitable container or supplying directly gravimetrically to the twin shaft kneader. If supplied directly, the dry blend need not necessarily be cooled. Cooling to below 40° C. is to prevent that, upon further cooling the dry mixture (dry blend), a vacuum results in the container, which could destroy the dry mixture.

b.) Gravimetric addition of the dry mixture (dry blend) to a twin shaft kneader and gravimetric addition of the solvent (EC/PC), which has been heated to between 40° and 80° C., in the ratio of between 15 and 45% by weight and preferably 28% by weight, based on the dry mixture (dry blend). Total mass flows (dry mixture plus solvent mixture) between 10 and 1500 kg/h are possible, depending on the size of the kneader.

c.) Preparation of the mass in the kneader at a temperature between 80° and 150° C. with a mechanical input of energy of between 50 and 100 Wh/kg based on the total mass flows, the polymer binder going into solution completely.

d.) The mass is discharged over a multiple orifice-type injector with a hole diameter of 2 to 5 mm with subsequent cooling (to below 40° C.) and cutter head strike off (head granulator), resulting in a granular material with a diameter of 2 to 5 mm and a length of between 5 and 10 mm.

e.) The granular material thus prepared can be packaged durably in aluminum composite foil or melted once again directly in a single screw conveyor at temperatures between 80° and 150° C. and be applied via a wide slot nozzle with a subsequent group of rollers as a follow-up at temperatures between 80° and 150° C. onto the respective substrate.

Variation 2: Preparation of a thermoplastic granular material by means of a vacuum mixing dryer with a solvent lance and rotating fly cutters, using PVDF as the polymer binder and EC as the only component of the solvent mixture.

a.) Mixing all of the powdery portions of the formulation (active material—NMC—93% by weight, conductivity additive—Timcal® SuperP and Timcal® KS4 2:3-2.5% by weight and polymer—Kynar® HSV900-4.5% by weight) in a vacuum mixing dryer at temperatures between 80° and 150° C. and at a pressure of less than 10 mbar for between 60 and 400 minutes, and in this case, preferably at 140° C. for 120 minutes. After that, cooling the mixture to a temperature below 65° C.

b.) Injecting the solvent mixture (EC) in a ratio of 15 to 45% by weight (preferably 28% by weight, in this case), based on the dry mixture (dry blend) and at a temperature of 80° C. into the vacuum of the mixing space.

c.) Cooling the whole of the mixture while rotating the mixer shaft and the cutter head to a temperature of less than 40° C. and emptying the mixer.

d.) The granular material thus prepared can be packaged durably in aluminum composite foil or melted directly once again in a single screw conveyor at temperatures between 80° and 150° C. and be applied via a wide slot nozzle with a subsequent group of rollers as a follow-up at temperatures between 80° and 150° C. onto the respective substrate.

Preferred Dry Mixtures
Anodes:
a) Granular Material with Graphite as the Active Material I. 61.1% by weight graphite (Hitachi SMG-A1-13cNT1 42.77% by weight+Hitachi MAGD 14.664% by weight), 3.9% by weight PVDF (Kynar® HSV900 2.34% by weight+Kynar® ADX161 1.26% by weight), solvent 35% by weight (ethylene carbonate EC). Ratio of binder to solvent 1:9

II. 61.1% by weight graphite (Hitachi SMG-A1-13cNT1 42.77% by weight+Hitachi MAGD 14.664% by weight), 3.9% by weight PVDF (Kynar® HSV900 2.34% by weight+Kynar® ADX161 1.26% by weight), solvent 35% by weight (ethylene carbonate/propylene carbonate EC/PC 3:1). Ratio of binder to solvent 1:9

III. 58.88% by weight graphite (Hitachi SMG-A1-13cNT1), 1.28% by weight conductivity additive (TIMCAL SuperC65), 3.84% by weight PVDF (Kynar® HSV900 2.496% by weight+Kynar® ADX161 1.344% by weight),. solvent 36% by weight (ethylene carbonate EC). Ratio of binder to solvent 1:9.4

IV. 58.88% by weight graphite (Hitachi SMG-A1-13cNT1), 1.28% by weight conductivity additive (TIMCAL SuperC65), 3.84% by weight PVDF (Kynar® HSV900 2.496% by weight+Kynar® ADX161 1.344% by weight), solvent 36% by weight (ethylene carbonate/propylene carbonate EC/PC 3:1). Ratio of binder to solvent 1:9.4

V. 65.28% by weight graphite (Hitachi SMG-A1-13cNT1), 0.51% by weight conductivity additive (Showa Denko VGCF®), 2.21% by weight PVDF (1.4365% by weight Kynar® HSV900+0.7735% by weight Kynar® ADX161), solvent 32% by weight (ethylene carbonate EC). Ratio of binder to solvent 1:14.5

VI. 65.28% by weight graphite (Hitachi SMG-A1-13cNT1), 0.51% by weight conductivity additive (Showa Denko VGCF®), 2.21% by weight PVDF (Kynar® HSV900+0.7735% by weight Kynar® ADX161), solvent 32% by weight (ethylene carbonate/propylene carbonate EC/PC 3:1). Ratio of binder to solvent 1:14.5

Note: Graphite is available from various manufacturers. For the examples, graphites of different manufacturers may be used; however, these should be very similar in their physical properties.

b) Granular Material with Lithium Titanate ($Li_4Ti_5O_{12}$) as the Active Material I. 55.8% by weight lithium titanate (Südchemie LTO EXM2228), 3.1% by weight conductivity additive (TIMCAL SuperC65 2.6% by weight+0.5% by weight Showa Denko VGCF®), 3.1% by weight PVDF (Kynar® HSV900 2.015% by weight+1.085% by weight Kynar® ADX161 0.7735% by weight, solvent 38% by weight (ethylene carbonate EC). Ratio of binder to solvent 1:12.25

II. 55.8% by weight lithium titanate (Südchemie LTO EXM2228), 3.1% by weight conductivity additive (TIMCAL SuperC65 2.6% by weight+0.5% by weight Showa Denko VGCF®), 3.1% by weight PVDF (2.015% by weight Kynar® HSV900+1.085% by weight Kynar® ADX161), solvent 38% by weight (ethylene carbonate EC+propylene carbonat EC:PC 3:1). Ratio of binder to solvent 1:12.25

Cathodes:
a) Granular Material with Lithium Iron Phosphate ($LiFePO_4$), as the Active Material I. 59.8% by weight lithium iron phosphate ($LiFePO_4$) (Südchemie LFP P2), 2.275% by weight conductivity additive (TIMCAL® KS6 1.775% by weight+0.5% by weight Showa Denko VGCF®), 2.925% by weight PVDF (1.901% by weight Kynar® HSV900+1.024% by weight Kynar® ADX161), solvent 35% by weight (ethylene carbonate EC). Ratio of binder to solvent 1:11.96

II. 59.8% by weight lithium iron phosphate ($LiFePO_4$) (Süchemie LFP P2), 2.275% by weight conductivity additive (TIMCAL® KS6 1.775% by weight+0.5% by weight Showa Denko VGCF®), 2.925% by weight PVDF (1.901% by weight Kynar® HSV900+1.024% by weight Kynar® ADX161), solvent 35% by weight (ethylene carbonate EC+propylene carbonate PC, EC:PC 3:1). Ratio of binder to solvent 1:11.96 b) Granular Material with Lithium Nickel Cobalt Aluminum Oxide (NCA)

I. 69.75% by weight nickel cobalt aluminum oxide (TODA NCA NAT-9070) 1.875% by weight conductivity additive (1.375% by weight TIMCAL® KS6+

0.5% by weight Showa Denko VGCF®), 3.375% by weight PVDF (2.193% by weight Kynar® HSV900+1.181% by weight Kynar® ADX161), solvent 25% by weight (ethylene carbonate EC). Ratio of binder to solvent 1:7.4

II. 69.75% by weight nickel cobalt aluminum oxide (TODA NCA NAT-9070) 1.875% by weight conductivity additive (1.375% by weight TIMCAL® KS6+0.5% by weight Showa Denko VGCF®), 3.375% by weight PVDF (2.193% by weight Kynar® HSV900+1.181% by weight Kynar® ADX161), solvent 25% by weight (ethylene carbonate EC+propylene carbonate PC, EC:PC 3:1).

c) Granular Material with Lithium Nickel Manganese Cobalt Oxide (NMC)

I. 67.5% by weight lithium nickel manganese cobalt oxide (TODA NMC NM3101), 3.75% by weight conductivity additive (0.9375% by weight TIMCAL® KS6+2.8125% by weight TIMCAL® SuperC65), 3.75% by weight PVDF (2.4375% by weight Kynar® HSV900+1.3125% by weight Kynar® ADX161, solvent 25% by weight (ethylene carbonate EC). Ratio of binder to solvent 1:6.66

II. 67.5% by weight lithium nickel manganese cobalt oxide (TODA NMC NM3101), 3.75% by weight conductivity additive (0.9375% by weight TIMCAL® KS6+2.8125% by weight TIMCAL® SuperC65), 3.75% by weight PVDF (2.4375% by weight Kynar® HSV900+1.3125% by weight Kynar® ADX161), solvent 25% by weight (ethylene carbonate EC+propylene carbonate PC, EC:PC 3:1). Ratio of binder to solvent 1:6.66

III. 111.71.61% by weight lithium nickel manganese cobalt oxide (TODA NMC NM3101), 2.31% by weight conductivity additive (1.81% by weight TIMCAL® KS6+0.5% by weight Showa Denko VGCF®), 3.08% by weight PVDF (2.002% by weight Kynar® HSV900+1.078% by weight Kynar® ADX161), solvent 23% by weight (ethylene carbonate EC). Ratio of binder to solvent 1:7.47

IV. 71.61% by weight lithium nickel manganese cobalt oxide (TODA NMC NM3101), 2.31% by weight conductivity additive (1.81% by weight TIMCAL® KS6+0.5% by weight Showa Denko VGCF®), 3.08% by weight PVDF (2.002% by weight Kynar® HSV900+1.078% by weight Kynar® ADX161), solvent 23% by weight (ethylene carbonate EC+propylene carbonate PC, EC:PC 3:1). Ratio of binder to solvent 1:7.47

Note: There are various manufacturers of the active materials for the cathodes. For the examples, active materials of different manufacturers may be used; however, these should be very similar in their physical properties.

Preparation of the Electrodes

Preparation of the Cathodes and Indirect and Direct Coating of the Anodes

1. Indirect Coating

The granular material obtained is melted once again by means of a single screw extruder and molded via a heated roller unit between two carrier films (of PET, PfEEK, Kapon or the like). (Parameters: mass flow, roller gap, temperature and take-off speed).

In the following step, this laminate is applied by means of a laminator on the respective charge eliminator foil (copper having a thickness of 9-12 µm for the anode or aluminum, and 10-15 µm for the cathode). This takes place in one step for the front and back of the respective charge-eliminator foil. The lamination unit is followed by a compression step, by means of which grooves are impressed in the still plastic mass by means of a structured pair of rollers, transverse to the running direction. Subsequently, the foil is cooled in order to remove the carrier or covering film of PET or the like. Subsequently, the coated foil is heated by means of IR radiation, and the solvent is removed at temperatures between 100° and 200° C. by a counter-current air flow method. After that, the foil is ready for further processing (calendering). Surface capacitances between 1.0 and 3.5 mAh/cm2 can be applied in this way. Depending on the type (for example, whether EC or PC is used), the solvent can be recycled.

2. Direct Coating

The granular material is melted once again by means of a single screw extruder and molded via a heated roller unit between the respective charge-eliminator foil (copper or aluminum) and covering film (of PET, PEEK, Kapon or the like). (Parameters: mass flow, roller gap, temperature and take-off speed, RPM). After the layer is formed, a compression step follows, by means of which grooves are impressed in the still plastic mass by means of a structured pair of rollers, transverse to the running direction. Subsequently, the foil is cooled in order to remove the carrier or covering film of PET or the like. This is followed by the first heating step of the solvent by IR radiation and counter-current air flow at temperatures between 100° and 200° C. This process is repeated on the back of the aluminum or copper foil. After that, the foil is ready for further processing (calendering). Surface capacitances between 1.0 and 3.5 mAh/cm2 can be applied in this way.

Depending on the type (for example, whether EC or PC is used), the solvent can be recycled.

3. Method without Covering Film:

The roller unit is configured in such a way that the respective rollers can be run at different rotational speeds. By these means, friction is produced between the rollers and the coating composition. Due to this friction, adhesion of the coating composition to one of the roller surfaces can be prevented. As a result, it is possible to do without the use of a covering film. However, wear at the surface of the roller cannot be ruled out.

What is claimed is:

1. A method for preparing a coating material for coating an electrode carrier of an electrical energy storage system, comprising the steps of:
   a) providing a dry mixture, containing at least i) active material, ii) a conductivity additive and iii) a fluorine-containing polymer binder, the fluorine-containing polymer binder being selected from a group consisting of polyvinylidene fluoride (PVDF), a polyvinylidene fluoride copolymer (PVDF-Copolymer), and a mixture of PVDF and at least one PVDF copolymer,
   b) bringing the dry mixture into contact with a solvent mixture containing at least 60% by weight ethylene carbonate and/or propylene carbonate or 60% by weight of any mixture thereof, the fluorine-containing polymer binder and the solvent mixture being present in a ratio of 1:(5-30), c) mixing the solvent mixture and the dry mixture at a temperature of more than 80° C. until the fluorine-containing polymer binder has dissolved completely in the solvent mixture, d) hardening the mixture obtained from step c) by cooling to a temperature below 40° C., and e) granulating the hardened mixture obtained from step d) to thereby form a granular material.

2. The method for preparing a coating material for coating an electrode carrier of an electrical energy storage system according to claim 1, further comprising:

f) adding up to 1% by weight of MgO, $Al_2O_3$, or a mixture thereof to the granular material obtained from step e).

3. The method for preparing a coating material for coating an electrode carrier of an electrical energy storage system according to claim 1, wherein the PVDF copolymer is selected from a group consisting of PVDF-hexafluoropropylene (PVDF-HFP), PVDF-tetrafluorethylene (PVDF-TFE), and PVDF-chlorotetrafluoroethylene (PVDF-CTFE).

4. The method of preparing a coating material for coating an electrode carrier of an electrical energy storage system according to claim 1, wherein the active material comprises one selected from a group consisting of graphite, amorphous carbons, lithium storage metals, lithium storage alloys, tin-carbon composites, SnC composites, SiSnC composites, aluminum, antimony, $Li_4Ti_5O_{12}$ (LTO), lithium metal oxides of $LiM_xM'_yM''_zO_a$ where each of M, M' and M'' is one selected from Co, Ni, Mn, Al and V; $0 \leq x \leq 0.85$, $0 \leq y \leq 0.5$, $0 \leq z \leq 0.1$, $1 \leq a \leq 4$; and M, M' and M'' are different from each other, the lithium metal oxides being optionally doped with at least one selected from a group consisting of magnesium, niobium, silicon carbides, magnesium oxides, titanium oxides, aluminum oxides, zirconium oxides and calcium carbides, and lithium metal phosphates being optionally doped with magnesium, niobium, silicon carbides, magnesium oxides, titanium oxides, aluminum oxides, zirconium oxides and calcium carbides.

5. The method of preparing a coating material for coating an electrode carrier of an electrical energy storage system according to claim 1, wherein the conductivity additive is selected from a group consisting of graphite with d50 between 1 μm and 8 μm, carbon blacks with primary particles between 10 and 80 nm, carbon fibers, and mixtures thereof.

6. The method for preparing a coating material for coating an electrode carrier of an electrical energy storage system according to claim 1, wherein the dry mixture contains 80 to 95% by weight active material, 1.5 to 5% by weight conductivity additive and 2 to 8% by weight fluorine-containing polymer binder.

7. The method for preparing a coating material for coating an electrode carrier of an electrical energy storage system according of claim 1, wherein the coating material is for the preparation of an anode, and the dry mixture contains 94% by weight active material, 2% by weight conductivity additive and 4% by weight polymer binder.

8. The method for preparing a coating material for coating an electrode carrier of an electrical energy storage system according to claim 1, wherein the coating material is for the preparation of a cathode, and the dry mixture contains 93% by weight active material, 3% by weight conductivity additive and 4% by weight polymer binder.

9. The method for preparing a coating material for coating an electrode carrier of an electrical energy storage system according to claim 1, wherein the active material comprises a filler selected from the group consisting of NaCl, KCl, $LiBF_4$, $LiClO_4$, LiBOB and $LiPF_6$, or mixtures of these fillers, a particle size of the filler being from 0.01 μm to 35 μm.

10. The method for preparing a coating material for coating an electrode carrier of an electrical energy storage system according to claim 4, wherein the active material further comprises a filler selected from the group consisting of NaCl, KCl, $LiBF_4$, $LiClO_4$, LiBOB and $LiPF_6$, or mixtures of these fillers, a particle size of the filler being from 0.01 μm to 35 μm.

* * * * *